(12) United States Patent
Ibrahim et al.

(10) Patent No.: US 10,890,066 B1
(45) Date of Patent: Jan. 12, 2021

(54) DETERMINATION OF A ROCK TESTABILITY INDEX FOR FORMATION TESTING

(71) Applicant: Saudi Arabian Oil Company, Dhahran (SA)

(72) Inventors: Mohd Azizi Ibrahim, Dhahran (SA); Clovis Satyro Bonavides, Dhahran (SA); Faisal Naif Enezi, Dammam (SA); Majed Fareed Kanfar, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/553,714

(22) Filed: Aug. 28, 2019

(51) Int. Cl.
*E21B 49/00* (2006.01)
*E21B 49/08* (2006.01)
*E21B 41/00* (2006.01)
*E21B 43/26* (2006.01)

(52) U.S. Cl.
CPC .......... *E21B 49/00* (2013.01); *E21B 41/0092* (2013.01); *E21B 49/087* (2013.01); *E21B 43/26* (2013.01)

(58) Field of Classification Search
None
See application file for complete search history.

(56) References Cited

U.S. PATENT DOCUMENTS

| 8,123,261 B2 | 2/2012 | Kikuchi et al. |
| 8,447,524 B2 | 5/2013 | Chen et al. |
| 2017/0315266 A1* | 11/2017 | Myers ................. G01V 99/005 |
| 2018/0238147 A1 | 8/2018 | Shahri et al. |

FOREIGN PATENT DOCUMENTS

| CN | 1138134 | 12/1999 |
| WO | WO 2017082897 | 5/2017 |

OTHER PUBLICATIONS

Grana et al., Quantitative Log Interpretation and Uncertainty Propagation of Petrophysical Properties and Facies Classification from Rock-physics Modeling and Formation Evaluation Analysis, 2012, Geophysics, vol. 77, No. 3 (Year: 2012).*

(Continued)

*Primary Examiner* — Roy Y Yi
(74) *Attorney, Agent, or Firm* — Fish & Richardson P.C.

(57) ABSTRACT

Methods for determining a rock testability index (RTI) include receiving petrophysical data of a geological formation at a particular rate. The petrophysical data is measured at each depth of a plurality of depths from a surface of the Earth. For each depth of the plurality of depths, an RTI is determined for the geological formation. The RTI indicates a probability of success for performing a hydrocarbon fluid formation test at each depth. The RTI is generated by normalizing a rock type of the geological formation. The RTI is adjusted based on a correspondence of the petrophysical data to hydrocarbon productivity. A display device generates a visual representation of the RTI at the particular rate. The visual representation indicates a potential hydrocarbon productivity of the geological formation.

20 Claims, 5 Drawing Sheets

(56) References Cited

OTHER PUBLICATIONS

Al-Shehri et al., "Utilizing NMR and formation pressure testing while drilling to place water injectors optimally in a field in Saudi Arabia," SPE 141783, presented at the SPE Middle East Oil and Gas Show and Conference, Manama, Bahrain, Sep. 25-28, 2011, 7 pages.

Kanfar et al., "Real-time integrated petrophysics: geosteering in challenging geology & fluid systems," SPE 160922, presented at the Young Professionals Technical Symposium, Dhahran, Saudi Arabia, Mar. 19-21, 2012, 10 pages.

Pineda et al., "Wireline formation fluid sampling: from making the value case, to applying the essons learned. A guide to improve rate of success while taking fluid samples in the lower for longer oil price environment," presented at the SPWLA 59th Annual Logging Symposium, London, UK, Jun. 2-6, 2018, 24 pages.

Xu et al., "When petrophysics meets big data: what can machine do?," SPE 195068, presented at the SPE Middle East Oil and Gas Show Conference, Manama, Bahrain, Mar. 18-21, 2019, 25 pages.

PCT International Search Report and Written Opinion in International Appln. No. PCT/US2020/048171, dated Oct. 30, 2020, 17 pages.

\* cited by examiner

```
┌─────────────────────────────────────────────────────────────────────┐
│ Receive, by a computer system, petrophysical data of a geological   │
│ formation at a particular rate, the petrophysical data measured at  │
│ each depth of multiple depths from a surface of the Earth           │
│                               304                                   │
└─────────────────────────────────────────────────────────────────────┘
```

```
┌─────────────────────────────────────────────────────────────────────┐
│ For each depth of the multiple depths, determine, using the         │
│ computer system, a rock testability index (RTI) for the geological  │
│ formation, the RTI indicating a probability of success for          │
│ performing a hydrocarbon fluid formation test at the each depth,    │
│ the determining of the RTI including:                               │
│ generating, using the computer system, the RTI, the generating      │
│ including normalizing a rock type of the geological formation; and  │
│ adjusting, using the computer system, the the RTI based on a        │
│ correspondence of the petrophysical data to hydrocarbon productivity│
│                               308                                   │
└─────────────────────────────────────────────────────────────────────┘
```

```
┌─────────────────────────────────────────────────────────────────────┐
│ Generate, using a display device of the computer system, a visual   │
│ representation of the RTI at the particular rate, the visual        │
│ representation indicating a potential hydrocarbon productivity of   │
│ the hydrocarbon reservoir                                           │
│                               312                                   │
└─────────────────────────────────────────────────────────────────────┘
```

DETERMINATION OF A ROCK TESTABILITY INDEX FOR FORMATION TESTING

TECHNICAL FIELD

This description relates generally to reservoir formation tests.

BACKGROUND

A formation test in a geological formation may be performed to determine an amount of hydrocarbons that a production well located at the geological formation will produce. Traditional methods for identifying a location for performing a formation test in a geological formation are sometimes based on manual interpretation of rock features or soil type. However, traditional methods, based on interpretation by an expert, are sometimes inadequate for identifying an optimal depth for performing a formation test, especially for drilling equipment that can traverse a wide range of depths across a large geological formation. Traditional methods can therefore lead to a large amount of resources spent performing formation tests at depths or locations within a geological formation that may not be suitable for formation testing.

SUMMARY

Methods for determining a rock testability index (RTI) are disclosed. In some embodiments, the methods include using a computer system to receive petrophysical data of a geological formation at a particular rate. The petrophysical data is measured at each depth of a plurality of depths from a surface of the Earth. For each depth of the plurality of depths, the computer system determines the RTI for the geological formation. The RTI indicates a probability of success for performing a hydrocarbon fluid formation test at the each depth. The computer system generates the RTI by normalizing a rock type of the geological formation. The computer system adjusts the RTI based on a correspondence of the petrophysical data to hydrocarbon productivity. A display device of the computer system generates a visual representation of the RTI at the particular rate. The visual representation indicates a potential hydrocarbon productivity of the geological formation.

These and other aspects, features, and implementations can be expressed as methods, apparatus, systems, components, means, or steps for performing a function, and in other ways.

These and other aspects, features, and implementations will become apparent from the following descriptions, including the claims.

DETAILED DESCRIPTION

Methods of determination of a rock testability index (RTI) are disclosed. A formation test is performed by a formation tester to determine the presence and composition of hydrocarbons in a geological formation. A formation test can also provide information to predict production rates of a future production well located at the geological formation. A formation test can include establishing one or more probes at a selected depth from the surface of the Earth within the geological formation. The probes are usually surrounded by an isolating element (for example, a packer) to eliminate interference caused by fluid in the geological formation.

The embodiments disclosed herein provide methods and systems for determining one or more depths from the surface of the Earth within a geological formation at which a formation test will have a higher probability of success compared to traditional methods. Among other benefits and advantages of the embodiments disclosed, the methods provide a continuous visual indication of favorable depths from the surface of the Earth where operational success is most likely. The RTI determined correlates to the fluid mobility and hydrocarbon productivity measured by formation tests. The methods are based on available petrophysical data acquired, for example, by logging-while-drilling (LWD) instruments and wireline instruments, mud logs, other instruments, rock mineralogy content, rock typing methods, or a combination thereof. Mud logs are produced by surface-based instruments. The cost and amount of resources required for designing and performing formation tests are therefore potentially reduced compared to traditional methods.

The RTI can also be used to determine depths from the Earth's surface that are potentially the most productive. A sum of the depths over the geological formation in combination with porosity and hydrocarbon saturation can be used to predict the well productivity. Using the RTI, the rig time and operational charges can be reduced, allowing for lower operational costs, increased drilling equipment productivity, and lower operational risks (by decreasing the exposure time of downhole testing equipment, which is prone to higher risks of getting stuck or lost downhole). Thus, the overall efficiency of formation testing operations compared to traditional methods is increased. Moreover, a reduction in the resources spent can be further achieved by avoiding formation testing when the geological formation at a particular depth shows a low chance of success.

Figure 1:
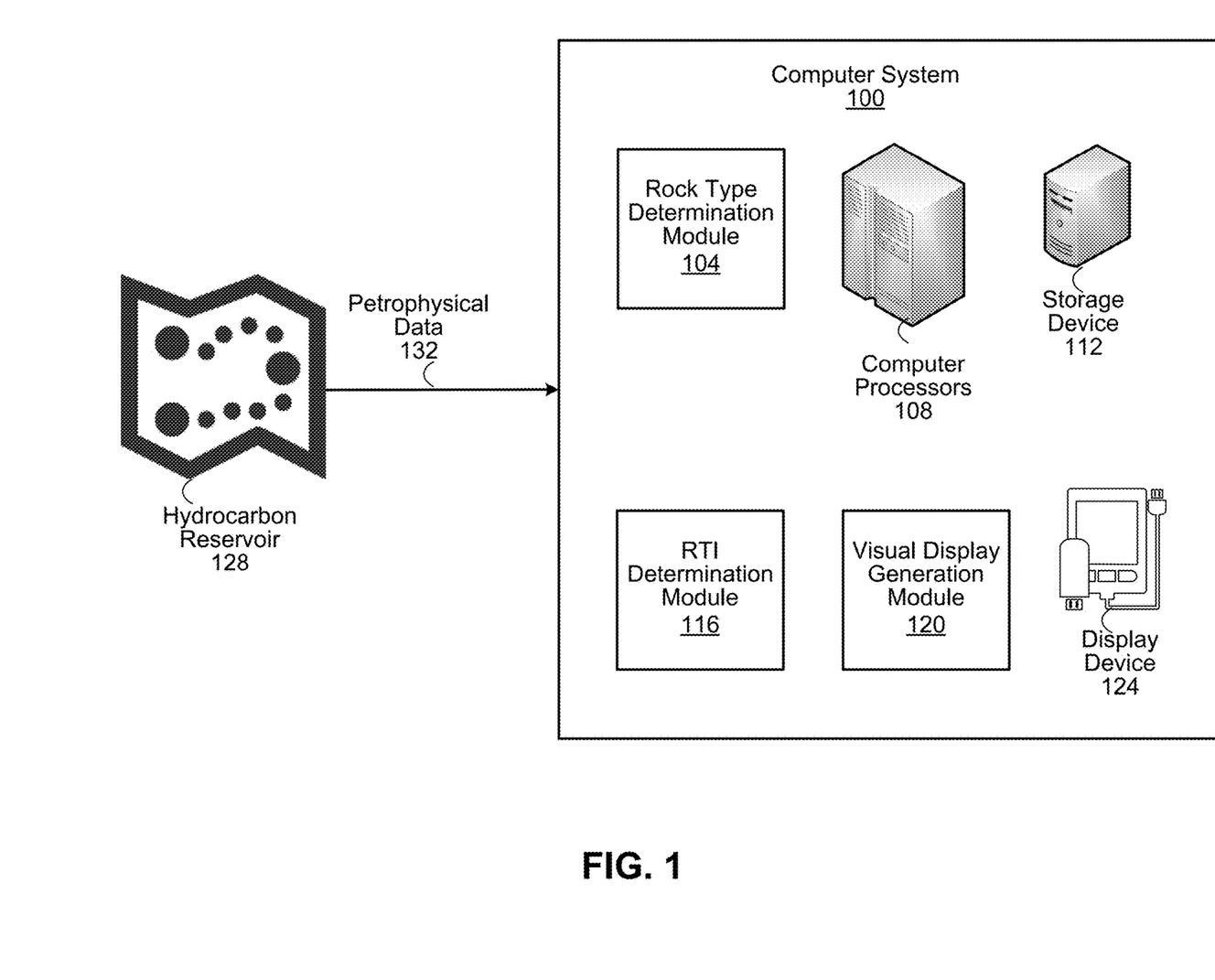
FIG. 1 illustrates a computer system for determination of a rock testability index (RTI), in accordance with one or more embodiments.

FIG. 1 illustrates a computer system 100 for determination of an RTI in a geological formation 128, in accordance with one or more embodiments. Among other components and parts, FIG. 1 illustrates the geological formation 128, petrophysical data 132, and the computer system 100. Data collection equipment (for example, logging-while-drilling (LWD) instruments and wireline instruments) in the geological formation 128 is communicably coupled to the computer system 100 over a network (for example, the Internet 528 or the local network 522 illustrated and described in more detail below with reference to FIG. 5).

A wellbore is formed from the Earth to the geological formation 128 to bring petroleum, oil, hydrocarbons, natural gas, or combinations of them to the surface. Perforations or other open hole completions are implemented in the wellbore to provide a path for the oil to flow from the surrounding rock into the production tubing. Acids and fracturing fluids may be pumped into the geological formation 128 to stimulate the reservoir rock to enable the wellbore to produce hydrocarbons.

The wellbore traverses multiple depths from the surface of the Earth. A formation test can correspondingly be performed at the respective depths. However, performing a formation test at a particular depth or location that is less suitable for formation testing can lead to sub-optimal results. For example, if a rock mineral content at a particular depth indicates that a percentage by volume of illite lies within a certain range of values, performing a formation test at the particular depth can lead to sub-optimal results. In another example, if a portion of the rock face that bounds the wellbore at a particular depth has low fluid mobility, low rock permeability, or is a bad hole, performing a formation test at the particular depth will likely lead to sub-optimal results because the measurements and data will be useless or suspect at best. A zone in the geological formation 128 that is impermeable or has a low permeability will not allow fluid to flow into a formation tester probe at a flow rate (such as a few cubic centimeters per second) that can fill a test chamber in a reasonable amount of time (such as 60 minutes). A stabilized pressure reading requires the test chamber to be filled or at least nearly filled for a valid formation pressure reading to be acquired. A bad hole refers to a hole that is not round usually due to the formation collapsing, damages inflicted by the drilling bit, or a combination thereof. Bad hole detection is used herein to avoid determining an RTI (or fluid mobility) at a particular depth from the surface of the Earth because the log measurements taken over bad hole depth intervals are suspect or false.

The embodiments disclosed herein provide methods and systems for determining an RTI for the geological formation 128 at multiple depths from the surface of the Earth using petrophysical evaluation. The RTI indicates a probability of success for performing a formation test within the geological formation 128 at the respective depth. For example, the RTI can indicate that a prospective depth has a good (or at least a minimally acceptable) likelihood of accomplishing the objectives of a formation test. The objectives can include acquiring a valid formation pressure reading, acquiring a formation fluid sample, predicting well productivity, or a combination thereof.

To determine the RTI, the petrophysical data 132 is acquired from the geological formation 128. In some embodiments, the petrophysical data 132 is measured by logging-while-drilling (LWD) instruments. The LWD instruments can be attached to a drill string and powered by a battery. The LWD instruments acquire the petrophysical data 132 while the geological formation 128 is being drilled. The LWD instruments transmit and receive information using pressure pulses applied to the drilling mud at the wellbore. In some embodiments, the petrophysical data 132 is measured by wireline instruments. The wireline instruments are attached to a cable (the "wireline") that provides mechanical support. The wireline instruments include electrical conductors for providing electrical power to the wireline instruments and transmitting electrical signals and data. The wireline instruments are run after a drilling phase of the geological formation 128 has been completed. In some embodiments, the petrophysical data 132 is acquired over the same depth or over different depths by the use of multiple conveyance methods such as LWD, wireline, mud logging (in which the elements of measurement are conveyed by the drilling mud flowing to the surface), or a combination thereof. Mud logs are produced by surface-based instruments.

The petrophysical data 132 can include different types of data acquired using an instrument containing sensors lowered into the wellbore. The petrophysical data 132 is thus measured at each depth of multiple depths from the surface of the Earth. The petrophysical data 132 includes "logs" as well as multiple petrophysical parameters derived from the logs. In some embodiments, the petrophysical data 132 includes multiple parameters or a log curve. The log curve can reflect a particular measurement of the geological formation 128 or a quantity derived from a measurement or from a combination of measurements (such as LWD logs, wireline logs, mud logs, and drilling parameters). A log can be acquired continuously across a particular range of depths from the surface of the Earth by conveying measuring instruments into the wellbore and traveling the measuring instruments past the rocks of the geological formation 128 at an appropriate speed. Some logs, such as mud logs, acquired on the surface in situ and drilling data can also be used for aiding the RTI determination.

The petrophysical data 132 can include a variety of different logs, for example, electrical, acoustic, nuclear, magnetic resonance, or a combination thereof. Each log "family" offers a variety of instrument configurations to measure different petrophysical properties in different wellbore or geologic environments. For example, electrical logs can measure a formation resistivity or a conductivity. Acoustic logs can measure properties of the rock material related to sound propagation. Nuclear logs can be used to measure rock density (for example, using Compton-scattering techniques), rock porosity (for example, using neutron-based techniques), radioactivity spectral contents, or to determine the rock elemental contents (for example, using neutron spectroscopy techniques). Porosity refers to the amount of rock volume (usually expressed as a percentage or as a fractional number) filled with fluid (as opposed to the rock's solid matrix). Hydrocarbon saturation ("Hsat") refers to the percentage of porosity occupied by hydrocarbons.

The petrophysical data 132 is acquired by the measuring instruments and received by the computer system 100 at a particular data rate. For example, the data rate can be determined in terms of records per foot, which is a typical sampling rate used in the well logging industry. Continuing with the example, the petrophysical data 132 includes 8-bit words and a record (a package of information to be attributed to a certain depth) includes, for example, 50 words of information. If 5 words are transmitted per second, acquiring a complete record takes 10 seconds. Thus, 6 records are acquired in a minute. If a rig drills at a rate of 60 feet per hour, or one foot per minute, 6 records are received for each foot drilled, which is equivalent to logging the geological formation 128 at a depth sampling rate of 1 record for every 2 inches.

In another example, the data rate can drop with increasing length of the wellbore and can fall to as low as 1.5 bps at a depth of 35,000 ft. Continuing with the example, the data rate can be determined as 90 bits per minute or 5400 bits per hour. Since a record (50 8-bit words) includes 400 bits, the data rate is 13.5 records per hour. If the geological formation 128 is drilled at 10 feet per hour (a typical drilling rate for very deep wells), approximately one record is collected every 9 inches. Data compression can be used to increase the effective data rate. The RTI is generated and output on the display device 124 as a continuous visual data stream at the same rate at which the petrophysical data of the geological formation 128 is acquired. Thus, the continuous RTI display can be used by an upstream petroleum engineer for conducting a formation test.

In some embodiments, the computer system 100 is communicably coupled to equipment within the geological formation 128 to receive the petrophysical data 132 (logs) from the hydrocarbon wells 128 for deriving certain parameters (for example, mineral contents of the rock, total porosity, effective porosity, water saturation, porosity distribution, bound water content, capillary water content, or permeability) from the petrophysical data 132. The parameters are derived using petrophysical analysis run on the logs. For example, the volume of shale (VSH) can be derived as VSH=(GRlogs−Grclean)/(GRshale−Grclean), where GRlogs denotes a gamma ray value in the logs, GRclean denotes the GR count rate measured in a formation that is clean (containing no clay), and GRshale denotes the Gama Ray count measured in a formation that is 100% clay. Note that many different clay types exist; however, they are more radioactive (due to the presence of several types of radioactive isotopes) than rocks such as Quartz and Calcites (pure sandstone and pure carbonate). The effective porosity (Øeffective) can be derived as Øeffective=Øtotal−(Øshale× VSH), where Øtotal denotes the total porosity and Øshale denotes the porosity of shale.

The petrophysical analysis includes processing the petrophysical data 132 (logs) that have been acquired in the geological environment in order to acquire other petrophysical parameters of the rocks, for example, parameters related to mineralogy, fluid composition, porosity, permeability, or a combination thereof. In other embodiments, the derivation of the parameters from the petrophysical data 132 can be performed locally at the geological formation 128, and the derived parameters are included within the petrophysical data 132 for determining petrophysical properties and the RTI.

The computer system 100 is used to determine the RTI for formation test feasibility in the geological formation 128. The RTI is used to identify and qualify test intervals (depth at which to perform a formation test) for the oil & gas reservoir 128. In some embodiments, the computer system 100 uses three different types of data for determination of the RTI: 1) values obtained directly from the log curves, 2) rock mineral contents derived from the log data using petrophysical analysis, and 3) data derived using rock typing (for example, Winland 35 rock typing or Winland 45 rock typing), permeability estimation based on petrophysical parameters, a porosity curve, or a combination thereof. In some embodiments, the derived data is used as a "starting point" (baseline) for RTI determination. The RTI is then modified (increased or decreased) based on the petrophysical parameters and the application of non-linear or linear discriminators (such as custom-defined cutoffs), RTI boosters, demoter factors, the usage of automated (computerized) statistical methods, or a combination thereof. The custom-defined cutoffs, RTI boosters, and demoter factors incorporate field- and reservoir-specific historical data. A continuous visual representation is generated and displayed (for example, as a color palette or map). An example palette 400 is shown and described in more detail below with reference to FIG. 4. The colors in the palette can indicate the RTI classification for testing purposes, ranging from non-prospective to highly prospective.

An implementation of the computer system 100 is illustrated and described below with reference to FIG. 5. The computer system includes a rock type determination module 104, one or more computer processors 108, a storage device 112, an RTI determination module 116, a visual display generation module 120, and a display device 124. The computer processors 108 are computer hardware used to perform the methods disclosed herein. The computer processors 108 are illustrated and described in more detail below with reference to FIG. 5. The storage device 112 is used to store data (for example, values obtained directly from the log curves, rock mineral contents, or data from a rock typing method) and instructions to perform the methods disclosed herein. The storage device 112 is illustrated and described in more detail below with reference to FIG. 5.

The rock type determination module 104 provides a classification Y (related to testing feasibility) of the rock encountered at a particular depth. The rock type Y determined by the rock type determination module 104 is a quality rating of the rock based on various criteria, which can vary across different rock-typing methodologies. The rock type determination module 104 can be implemented using software or special-purpose hardware, for example, as illustrated and described with reference to FIG. 5 below.

In some embodiments, as part of the process for determining the rock's feasibility for testing, the computer system 100 determines whether a portion of the rock face that bounds the wellbore at a particular depth is likely to present low fluid mobility or low rock permeability, or is classified as being a bad hole. The determination of whether the portion of the geological formation 128 at the particular depth is free of a bad hole can be performed using a caliper log and secondary measurements such as delta rho (DRHO) delivered as part of the formation bulk density log. For example, density value correction (the DRHO), which is delivered as a component of formation density logs, indicates a magnitude by which a density measurement departs from the expected density. The departure can be caused by anomalies in the hole shape and by the presence of non-rock material such as the "mud-cake" formed by drilling mud materials. DRHO is the amount of correction applied in order to display the most probable ("correct") density measurement.

The computer 100 determines the RTI at the particular depth responsive to determining that the portion of the geological formation 128 is free of a bad hole. If the computer system 100 determines the rock at a particular depth has low fluid mobility or low permeability, or there is a bad hole, the RTI is not determined at the particular depth. If a bad hole is found, the computer system 100 will not perform the RTI determination because the petrophysical measurements will likely be questionable or suspect for accuracy. Instead, the visual display generation module 120 will generate a warning icon, an informational icon, text explaining the bad hole condition, or a stripe of a particular color (for example, white).

The computer system 100 analyzes the petrophysical data 132 (logs and the petrophysical parameters derived from the logs) acquired in the geological environment to derive further petrophysical parameters of the rocks, such as mineralogy, fluid composition, fluid saturation, porosity, permeability, or a combination thereof. The rock type determination module 104 determines the rock type Y based on the determined petrophysical parameters derived from the logs. The rock type Y is determined based on parameters such as porosity, permeability, a clay index (that can be derived from a spectral gamma log), pore size distribution (that can be derived from a magnetic resonance log), or a combination thereof. For example, a rock having porosity greater than 10% and having a minimal clay content (2%) in a sand channel environment is classified as having a greater probability for acquiring a pressure reading and a hydrocarbon sample (probability of success for performing a formation test). Continuing the example, the rock type Y is determined as 36. On the other hand, a rock having a lesser porosity (5% or 6%) and a proportion of clay greater than 20% is classified as having a lesser probability for acquiring a pressure reading and a hydrocarbon sample. Continuing the example, the rock type Y is determined as −7.

In some embodiments, the rock type determination module 104 determines the rock type Y using a method based on Winland 45 rock typing. Winland 45 refers to the rock pore throat radius (PTR) at 45% mercury saturation as determined by mercury injection procedures conducted by a rock test laboratory. The computer system 100 executes the rock typing method based on Winland 45 using the processors 108. In other embodiments, rock typing methods based on Winland 35, flow zone indicator (FZI), pore geometry structure (PGS), or the Lucia method can be used. The different methods used to determine the rock type Y use different cutoffs for determining the rock type Y.

The rock type Y is normalized to obtain an initial RTI. For example, if $Y \leq a1$, then RTI=1. Continuing the example, if $a1<Y \leq a2$, then RTI=2. If $a5<Y \leq a6$, then RTI=6. If $a6<Y$, then RTI=7, where a1, a2, a5, and a6 are constants determined based on the rock typing method and on historical data acquired by statistics-based association of Y with a rock productivity index. The association of Y and RTI is derived for simple rocks that contain a single mineral, such as a clean sandstone, a clean calcite, or a clean dolomite rock. The petrophysical parameters derived from the log measurements provide information regarding the complexity of the rock associated with the presence of other complex minerals, the nature of contained fluids (gas, oil, water), the pore size distribution, an in situ stress, anisotropy, or a combination thereof. In some embodiments, when only a few petrophysical parameters are known, the mineralogy (basic rock matrix, volumetric proportion, and nature of clays) and fluid content are used to determine the RTI. For example, a given rock typing method can produce a number between −11 and 47. The rock type range −11 to −7 corresponds to an initial RTI of 7. Continuing the example, the rock type range −7 to 4 corresponds to an initial RTI of 6. Similarly, the rock type range 36 to 47 corresponds to an initial RTI of 1. In some embodiments, the RTI scale is discrete (such as 1 to 7 in steps of 1, or 0 to 13 in steps of 1) or continuous.

The RTI determination module 116 provides a metric indicating prospective test quality of a geological rock traversed by the wellbore using the petrophysical data 132 data acquired in the wireline or LWD logs. The RTI determination module 116 can be implemented using software or special-purpose (embedded) hardware, for example, as illustrated and described with reference to FIG. 5 below. For each depth of the multiple depths traversed by the measuring instruments, the RTI determination module 116 determines an RTI value for the geological formation 128. The RTI indicates a probability of success for performing a hydrocarbon fluid formation test at each depth. For example, the RTI can be tailored (normalized) to range from 1 to 7, with 1 being the lowest probability of success and 7 being the highest probability of success. In another example, the RTI can similarly range either continuously or in discrete steps from 0 to 1, or from 1 to 100.

The RTI determination module 116 adjusts the RTI based on a correspondence of the petrophysical data 132 to a flow index, a predicted production rate, or hydrocarbon productivity. The production rate or hydrocarbon productivity can be measured in terms of a rate expressed as a volume or a weight measured at pre-defined conditions of temperature and pressure per unit time (such as a day or an hour). The values of certain petrophysical parameters (for example, percentage by volume of illite) in the petrophysical data 132 can correspond to a decrease in the production rate or hydrocarbon productivity. The correspondence of the petrophysical data 132 to a predicted production rate or hydrocarbon productivity is derived using historical data on oil well production rates, known from experiments performed on geological formations, or received from another entity.

As an example of the direct usage of a log measurement in the calculation of RTI, in some embodiments, the RTI determination module 116 determines that a sonic travel time recorded by the petrophysical data 132 in the presence of a particular rock is less than a threshold sonic travel time. For example, the RTI determination module 116 decreases the RTI responsive to the petrophysical data 132 indicating that a rock detected in the geological formation 128 is a particular mineral (such as sandstone) and that a sonic travel time is less than a threshold sonic travel time because the correspondence of the petrophysical data 132 indicates a decrease in the hydrocarbon productivity. Continuing the example, if the environment is a sandstone and the sonic travel time is less than 65, the RTI is set to 1, regardless of other inputs. In another example, if the uranium content exceeds 25 ppm, the RTI is not decreased. Similarly, the values and correspondence of other parameters to hydrocarbon productivity, such as a neutron porosity, bulk density, density porosity, deep resistivity, shallow resistivity, a ratio of deep resistivity to shallow resistivity, or the content of gamma rays, potassium, thorium, or uranium content can be used to increase or decrease the RTI.

Exemplifying the usage of derived petrophysical quantities and parameters (physical and lithological), the RTI value can be modified (increased or decreased) based on 1) an amount of potassium, thorium, or both, 2) a difference between the porosity measured by a neutron-based tool and a porosity measured by a density tool, or 3) a Poisson ratio (a number based on certain mechanical properties of the rock material) determined from acoustic measurements. The amounts of thorium and potassium indicate the type of clay in the geological formation 128. For example, if the VSH>10% and the ratio of thorium to potassium is large, the geological formation 128 is considered to have a lower RTI. The porosity measured using a neutron-based tool includes the shale porosity and will show a greater porosity in a zone having shale. The porosity measured by a density tool refers to the pore percentage in the rock. The Poisson ratio is an elastic constant that is a measure of the compressibility of material perpendicular to an applied stress, or the ratio of latitudinal to longitudinal strain. The Poisson ratio is expressed as $V=\frac{1}{2} (V_P^2 - 2V_S^2)/(V_P^2 - V_S^2)$, where $V_P$ is the velocity of a compressional wave and $V_S$ is the velocity of a shear wave.

In some embodiments, the RTI determination module 116 determines that a percentage by volume of a particular mineral in the geological formation 128 is greater than a threshold. For example, the RTI determination module 116 decreases the RTI responsive to the petrophysical data 132 indicating that a percentage by volume of a particular mineral (such as anhydrite) is greater than a threshold percentage by volume because the correspondence of the petrophysical data 132 indicates a decrease in the hydrocarbon productivity. Continuing the example, if the rock contains more than 30% of anhydrite or more than 50% of clay minerals by volume, the RTI is decreased, regardless of the presence of any other minerals or of the porosity. For carbonate rocks, the RTI can be adjusted based on a percentage of dolomite or calcite.

As an example of a combination of different petrophysical factors, if a sum by volume of clays and anhydrite exceeds a certain amount such as 40%, the RTI can be decreased by a substantial amount. In another example, a ratio of porosity to clay content can be used. The adjustments to RTI may be performed in a linear or non-linear manner. The RTI can also be set to a lowest or highest possible value (as a drastic non-linear adjustment), depending on the nature of the petrophysical and lithological parameters and factors involved.

In some embodiments, the RTI determination module 116 determines the presence of a particular fluid. For example, the RTI determination module 116 increases the RTI responsive to the petrophysical data 132 indicating that a fluid detected in the geological formation 128 is a hydrocarbon gas mixture because the correspondence of the petrophysical data indicates an increase in the hydrocarbon productivity. Continuing the example, if the fluid detected in the rock (as determined by the petrophysical evaluation carried out on the log measurements) is a hydrocarbon gas mixture, the RTI is increased by 2. If the fluid is oil or water, the RTI is increased by 1.

In some embodiments, the RTI determination module 116 determines that an amount of mud-cake measured by calipering a wellbore of the geological formation 128 at a particular depth is greater than a threshold amount of mud-cake. Mud-cake refers to the particulates that can coat the inside of the wellbore after a suspension medium has seeped through a porous geological formation. The RTI determination module 116 increases the RTI responsive to the petrophysical data 132 indicating that the amount of mud-cake, associated with the nature of the drilling mud, is greater than the threshold amount of mud-cake because the correspondence of the petrophysical data 132 indicates an improved permeability, which indicates an increase in the hydrocarbon productivity. For example, the RTI is increased by (mud-cake thickness/0.1). An example of computer code to modify the RTI is: if MC>0.1, then RTI=RTI+round (MC/0.2), endif. In the previous example, MC denotes mud-cake thickness.

The well environment, for example, the nature of the drilling mud (oil-based or water-based), can also affect the testability of the rock. Increases or decreases to the RTI are applied in steps of different sizes and the adjustments can be proportional to certain petrophysical parameters or based on discrete cutoffs. The presence of certain drilling mud components in certain well environments can change the mud-cake logic. In such cases, an increased mud-cake presence indicates an increased probability of rock pore blocking by certain mud particles (such as barite). An example of computer code to modify the RTI is: if (Mud_System is Barite) and (MC>0.1), then RTI=RTI −2, endif.

In some embodiments, custom-defined cutoffs are implemented to incorporate historical data obtained from the oil field. The cutoffs are parameters defining a range of values below or above which a certain decision is taken. For example, a 5% cutoff can be set for the rock porosity, such that if the porosity is lower than 5% the RTI will be too low and the rock is not producible, in which case the RTI would be set to its lowest value independent of other factors. In another example, if the content of the mineral illite exceeds a cutoff value of 10% of the rock volume, the RTI is set to 1. The cutoffs can be established from historical data. For example, if the volume of illite is greater than 8% and the porosity is less than 15%, the rock will not produce oil or gas, or is not testable using a wireline formation tester because the rock is likely too tight possibly due to blocking of pore throats by the illite (clay) material. In another example, if the volume of illite lies between 3% and 8%, the RTI can be decreased by 1. If the volume of illite lies between 10% and 20%, the RTI is decreased by 2. The custom cutoffs can be established for other minerals such as quartz, calcite, dolomite, anhydrite, kaolinite, muscovite, halite, silt, gypsum, chlorite, coal, orthoclases, siderite, smectite, pyrite, or kerogen.

In some embodiments, the cutoffs are determined by an automated statistics-based method that achieves error minimization in the RTI determination. The RTI can also be arbitrarily ranged, such as from 0 to 10, 1 to 12, or be set to be a continuous quantity between arbitrary normalized limits. The RTI can be a continuous quantity or change in discrete steps.

In some alternate embodiments, a feature vector is extracted from the petrophysical data 132. The features can include production conditions, parameters of interest, or combinations of parameters to reduce redundancy in the petrophysical data 132 by transforming the petrophysical data 132 into a reduced set of features (the feature vector). The feature vector contains the relevant information from the petrophysical data 132, such that features of interest can be used by a machine learning model instead of the complete petrophysical data 132. The feature vector is indicative of whether a respective depth of a geological formation 128 will have a good probability of success for performing a formation test. The computer system 100 can generate a trained machine learning model, wherein the machine learning model is trained based labeled training data, to determine an RTI. The trained machine learning model determines the RTI when applied to a new feature vector from the geological formation 128.

The visual display generation module 120 generates a continuous visual representation of the RTI at the same rate at which the petrophysical data is acquired or received by the computer system 100. The visual display generation module 120 can be implemented using software or special-purpose hardware, for example, as illustrated and described with reference to FIG. 5 below. The RTI value is used as a quality indicator to guide petroleum engineers in selecting favorable depth intervals to perform formation tests and to discard testing at depths that have a low prospecting possibility based on the RTI value. A graphical representation of the continuous RTI output can be generated for visualization using icons, text, numbers, or a color palette. The visual representation indicates a potential hydrocarbon productivity of the geological formation 128. The visual representation can further indicate a hydraulic fracturing potential and an injectivity potential of the geological formation 128. The hydraulic fracturing potential refers to a predicted production rate for the geological formation 128 by stimulating the rock by a pressurized liquid. The injectivity potential refers to the probability of success for injecting high-pressure fluid into the wellbore to create cracks in the deep-rock formations through which natural gas, petroleum, and brine can flow more freely.

The display device 124 displays results of the processing by the processors 108 to a user. The display device 124 is illustrated and described in more detail below with reference to FIG. 5. An example visual representation of the RTI is illustrated below with reference to FIG. 2.

Once the visual representation of the RTI is generated, a hydrocarbon fluid formation test can be performed at each depth within the geological formation 128 responsive to the RTI determined at the depth exceeding a threshold value. For example, if the range of possible RTIs is 1-7, the threshold value can be set to 3 or 4.

Figure 2:
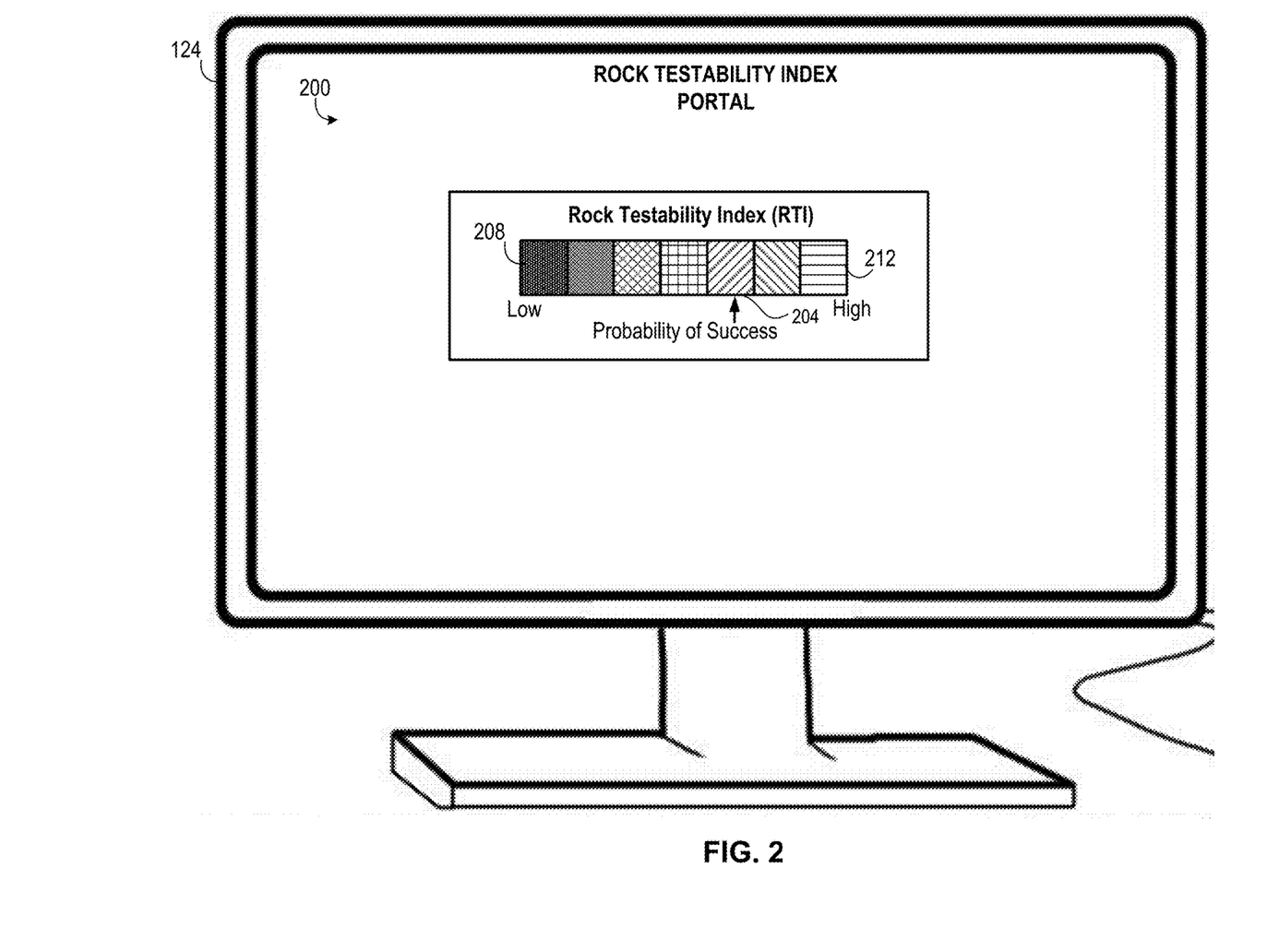
FIG. 2 shows a visual representation of an RTI, in accordance with one or more embodiments.

FIG. 2 shows a visual representation 200 of an RTI for formation tests in a geological formation 128, in accordance with one or more embodiments. The geological formation 128 is illustrated and described in more detail above with reference to FIG. 1. The visual representation 200 of the RTI is displayed on the display device 124, which is illustrated and described in more detail below with reference to FIG. 5.

The visual representation 200 of the RTI includes an icon 204 indicating the RTI. Multiple icons (for example, 208, 212) can be used to represent the range of possible RTI values. Each icon indicates a respective potential hydrocarbon productivity of the geological formation 128. Each icon can further indicate a respective hydraulic fracturing potential and a respective injectivity potential of the geological formation 128. In some embodiments, the multiple icons form a color palette. For example, each RTI value can be represented by a different color from 1=Black (icon 208) to 7=Yellow (icon 212). A brighter color can indicate a "good quality" rock having a higher probability of good measurements from a formation test. The black color can indicate a tight rock having a lower probability of good measurements from a formation test. When a bad hole is encountered, the color white can be output, indicating that no rock typing was performed. In other embodiments, the icons can include text, numbers, or graphical icons.

The RTI in conjunction with the porosity and the hydrocarbon saturation (Hsat) determined by the petrophysical evaluation can also be used to indicate optimal depths from the surface of the Earth for producing oil (by inserting perforations). An integrated value of the RTI can be used as an indication of a well's productivity potential (WPP). For example, WPP=$\Sigma(\Sigma c^{RTI-1} \times porosity \times Hsat)$, determined over hydrocarbon-bearing intervals exhibiting Hsat>X, where c is a constant and X is a threshold hydrocarbon saturation. The expression ($\Sigma c^{RTI-1} \times porosity \times Hsat$) denotes a depth interval and $\Sigma(\Sigma c^{RTI-1} \times porosity \times Hsat)$ denotes the sum of intervals (over the entire well). The RTI is generated and output on the display device 124 as a continuous visual data stream at the same rate at which the petrophysical data 132 of the geological formation 128 is acquired. Thus, the continuous RTI display 200 can be readily used by a downstream petroleum engineer for conducting a formation test.

Figure 3:
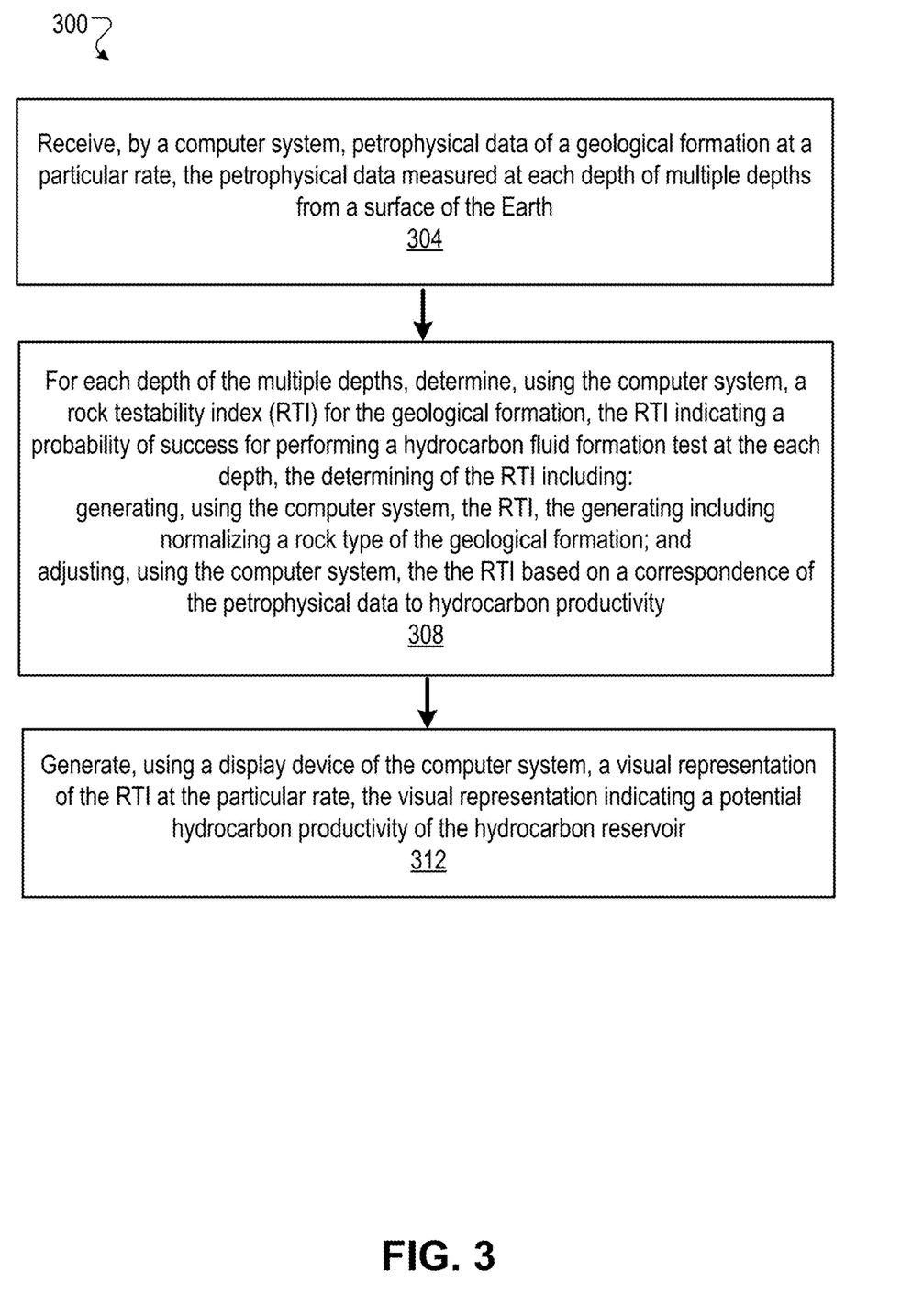
FIG. 3 shows a process for determination of an RTI, in accordance with one or more embodiments.

FIG. 3 shows a process 300 for determination of an RTI in a geological formation 128, in accordance with one or more embodiments. The geological formation 128 is illustrated and described in more detail above with reference to FIG. 1. In some embodiments, the process 300 is performed by the computer system 100 illustrated and described in more detail with reference to FIG. 1 above.

The computer system 100 receives 304 petrophysical data 132 of a geological formation 128 at a particular rate. The petrophysical data 132 is illustrated and described in more detail with reference to FIG. 1 above. The petrophysical data 132 is measured at each depth of multiple depths from the surface of the Earth. In some embodiments, the petrophysical data 132 is measured by logging-while-drilling (LWD) instruments, wireline-conveyed tools, surface instruments, or a combination thereof, and also be complemented by data logged by the drilling rig instrumentation. The petrophysical data 132 can include a variety of different logs, for example, electrical, acoustic, nuclear, or magnetic resonance. Each log "family" offers a variety of instrument configurations to measure different petrophysical properties in different wellbore or geologic environments.

For each depth of the multiple depths, the computer system 100 determines 308 an RTI for the geological formation 128. The RTI indicates a probability of success for performing a hydrocarbon fluid formation test at the depth. An initial RTI is generated using the computer system 100 by normalizing a rock type Y of the geological formation 128. The RTI is adjusted by the computer system based on a correspondence of the petrophysical data 132 to hydrocarbon productivity.

The computer system 100 generates 312 a visual representation 200 of the RTI at the particular rate using a display device 124 of the computer system 100. An example visual representation 200 and display device 124 is illustrated and described in more detail with reference to FIG. 2 above. The visual representation 200 indicates a potential hydrocarbon productivity of the geological formation 128.

Figure 4:
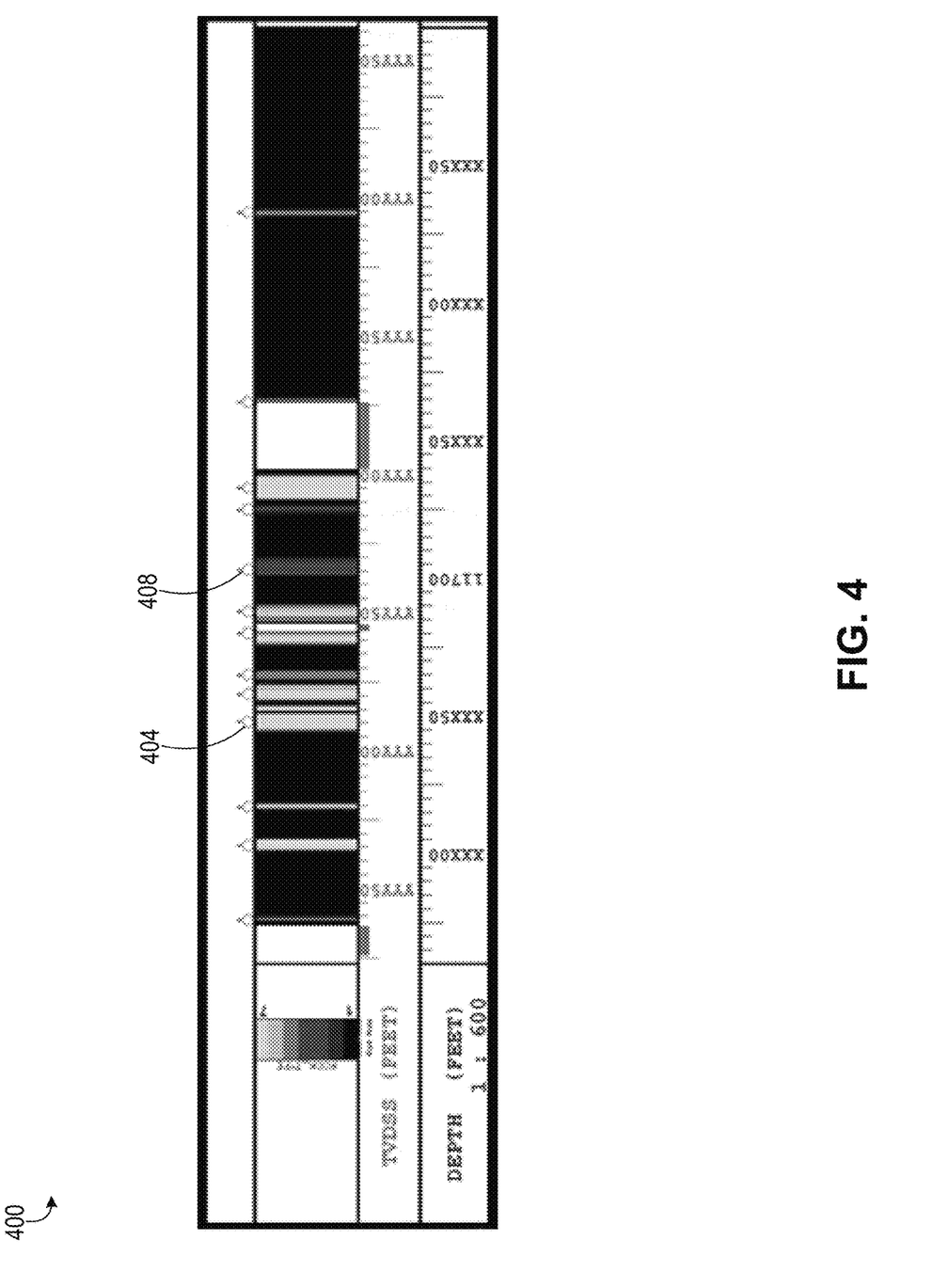
FIG. 4 shows a visual palette for representing an RTI, in accordance with one or more embodiments.

FIG. 4 shows a visual palette 400 for representing an RTI, in accordance with one or more embodiments. The visual palette 400 is generated by the display device 124 at the rate at which the petrophysical data 132 of the geological formation 128 is received. The visual palette 400 indicates a potential hydrocarbon productivity of the geological formation 128. In some embodiments, the visual palette 400 further indicates a hydraulic fracturing potential and an injectivity potential of the geological formation as described in more detail above with reference to FIG. 1. A downstream petroleum engineer can therefore perform a hydrocarbon fluid formation test at a particular depth within the geological formation 128 responsive to the RTI determined at the each depth (and shown on the palette 400) exceeding a threshold value. The visual palette 400 includes multiple icons 404, 408. Each icon (for example, icon 404) indicates a respective potential hydrocarbon productivity of the geological formation 128, a respective hydraulic fracturing potential, or a respective injectivity potential.

Each icon (such as icon 404) indicates a depth at which to perform a formation test. An icon is displayed at each depth that has testability potential. A petroleum engineer can choose to test only at depths displaying certain colors corresponding to an RTI equal to or greater than 4, as an example. An icon can indicate the best RTI of a particular depth interval. A process of automatically selecting test depths based on user inputs or default parameters can further be automated. Different icons can be used to differentiate between most favorable test points by shape, size, color or a combination thereof.

Figure 5:
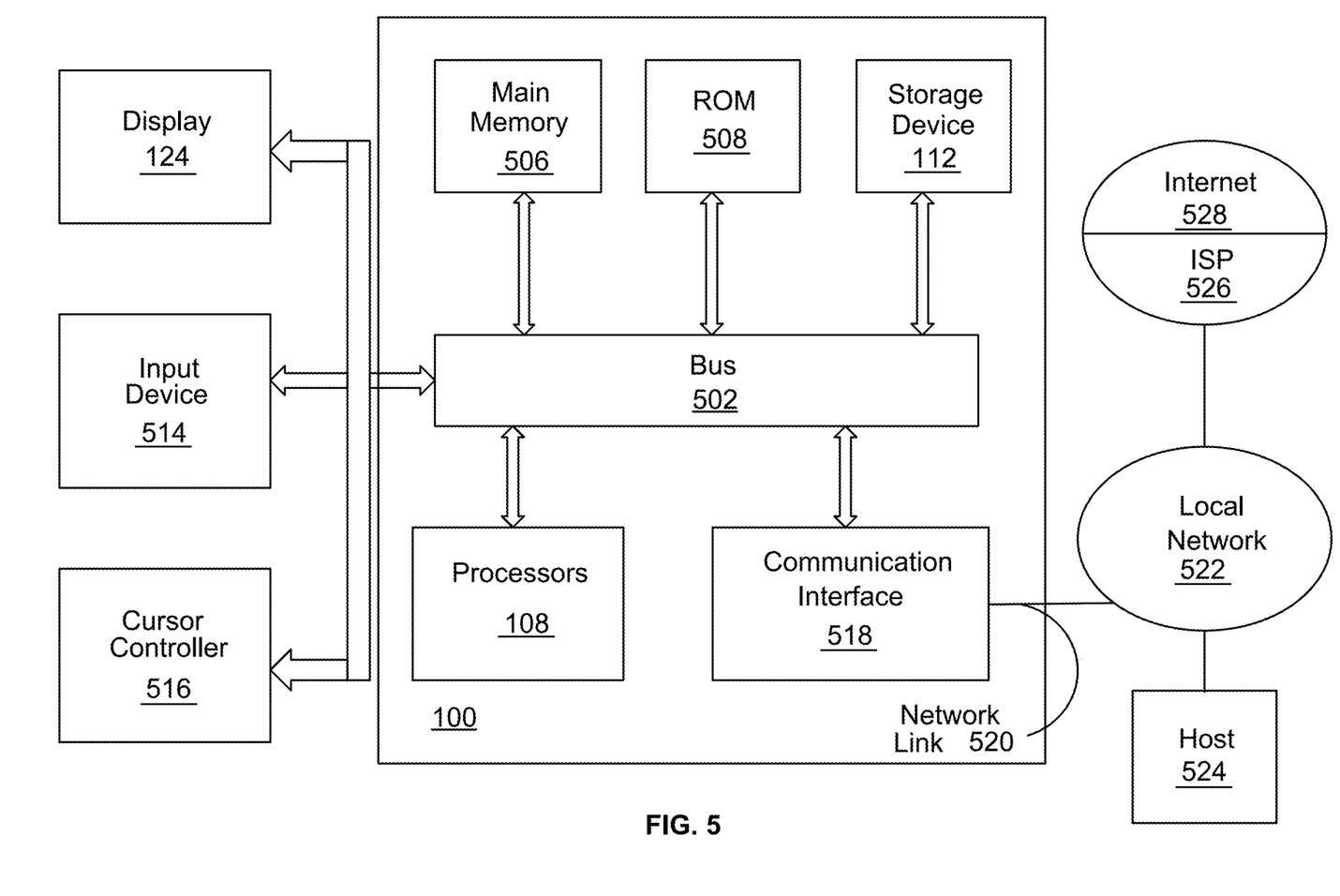
FIG. 5 shows an example implementation of a computer system for determination of an RTI, in accordance with one or more embodiments.

FIG. 5 shows an example implementation of the computer system 100, in accordance with one or more embodiments. In the example implementation, the computer system 100 is a special purpose computing device. The special-purpose computing device is hard-wired to determine the RTI for formation tests in a geological formation or includes digital electronic devices such as one or more application-specific integrated circuits (ASICs) or field programmable gate arrays (FPGAs) that are persistently programmed to perform the techniques herein, or may include one or more general purpose hardware processors programmed to perform the techniques pursuant to program instructions in firmware, memory, other storage, or a combination. In various embodiments, the special-purpose computing devices are desktop computer systems, portable computer systems, handheld devices, network devices or any other device that incorporates hard-wired or program logic to implement the techniques.

In an embodiment, the computer system 100 includes a bus 502 or other communication mechanism for communicating information, and one or more computer hardware processors 108 coupled with a bus 502 for processing information. The hardware processors 108 are, for example, general-purpose microprocessors. The computer system 100 also includes a main memory 506, such as a random-access memory (RAM) or other dynamic storage device, coupled to the bus 502 for storing information and instructions to be executed by processors 108. In one implementation, the main memory 506 is used for storing temporary variables or other intermediate information during execution of instructions to be executed by the processors 108. Such instructions, when stored in non-transitory storage media accessible to the processors 108, render the computer system 100 into a special-purpose machine that is customized to perform the operations specified in the instructions.

In an embodiment, the computer system 100 further includes a read only memory (ROM) 508 or other static storage device coupled to the bus 502 for storing static information and instructions for the processors 108. A storage device 112, such as a magnetic disk, optical disk, solid-state drive, or three-dimensional cross point memory is provided and coupled to the bus 502 for storing information and instructions.

In an embodiment, the computer system 100 is coupled via the bus 502 to a display 124, such as a cathode ray tube (CRT), a liquid crystal display (LCD), plasma display, light emitting diode (LED) display, or an organic light emitting diode (OLED) display for displaying information to a computer user. An input device 514, including alphanumeric and other keys, is coupled to bus 502 for communicating information and command selections to the processors 108.

According to one embodiment, the techniques herein are performed by the computer system 100 in response to the processors 108 executing one or more sequences of one or more instructions contained in the main memory 506. Such instructions are read into the main memory 506 from another storage medium, such as the storage device 112. Execution of the sequences of instructions contained in the main memory 506 causes the processors 108 to perform the process steps described herein. The term "storage media" as used herein refers to any non-transitory media that store data or instructions that cause a machine to operate in a specific fashion. The media includes, for example, optical disks, magnetic disks, solid-state drives, or three-dimensional cross point memory, such as the storage device 112. Storage media is distinct from but may be used in conjunction with transmission media. Transmission media participates in transferring information between storage media. For example, transmission media includes coaxial cables, copper wire and fiber optics, including the wires that comprise the bus 502.

The computer system 100 also includes a communication interface 518 coupled to the bus 502. The communication interface 518 provides a two-way data communication coupling to a network link 520 that is connected to a local network 522. For example, the communication interface 518 is an integrated service digital network (ISDN) card, cable modem, satellite modem, or a modem to provide a data communication connection to a corresponding type of telephone line. As another example, the communication interface 518 is a local area network (LAN) card to provide a data communication connection to a compatible LAN. In some implementations, wireless links are also implemented. In any such implementation, the communication interface 518 sends and receives electrical, electromagnetic, or optical signals that carry digital data streams representing various types of information.

The network link 520 typically provides data communication through one or more networks to other data devices. For example, the network link 520 provides a connection through the local network 522 to a host computer 524 or to a cloud data center or equipment operated by an Internet Service Provider (ISP) 526. The ISP 526 in turn provides data communication services through the world-wide packet data communication network now commonly referred to as the "Internet" 528. The local network 522 and Internet 528 both use electrical, electromagnetic or optical signals that carry digital data streams.

What is claimed is:

1. A method comprising:
receiving, by a computer system, petrophysical data of a geological formation at a particular rate, the petrophysical data measured at each depth of a plurality of depths from a surface of the Earth;
for each depth of the plurality of depths, determining, using the computer system, a rock testability index (RTI) for the geological formation, the RTI indicating a probability of success for performing a hydrocarbon fluid formation test at the each depth, the determining of the RTI comprising:
generating, using the computer system, the RTI, the generating comprising normalizing a rock type of the geological formation; and
adjusting, using the computer system, the RTI based on a correspondence of the petrophysical data to hydrocarbon productivity;
generating, using a display device of the computer system, a visual representation of the RTI at the particular rate, the visual representation indicating a potential hydrocarbon productivity of the geological formation; and
performing the hydrocarbon fluid formation test at the each depth within the geological formation responsive to the RTI determined at the each depth exceeding a threshold value.

2. The method of claim 1, wherein the visual representation of the RTI further indicates a hydraulic fracturing potential and an injectivity potential of the geological formation.

3. The method of claim 1, wherein the adjusting of the RTI comprises:
modifying the RTI responsive to the petrophysical data indicating that the geological formation comprises a particular mineral and that at least one of a density porosity measurement, a sonic travel time measurement, a neutron porosity measurement, a clay content by volume, or a mud-cake measurement exceeds a threshold quantity, the correspondence of the petrophysical data indicating a change in the hydrocarbon productivity.

4. The method of claim 1, wherein the adjusting of the RTI comprises:
modifying the RTI responsive to the petrophysical data indicating that a percentage by volume of a particular mineral in the geological formation is greater than a threshold percentage by volume, the correspondence of the petrophysical data indicating a change in the hydrocarbon productivity.

5. The method of claim 1, wherein the adjusting of the RTI comprises:
increasing the RTI responsive to the petrophysical data indicating that a fluid detected in the geological formation is a hydrocarbon gas mixture, the correspondence of the petrophysical data indicating an increase in the hydrocarbon productivity.

6. The method of claim 1, wherein the adjusting of the RTI comprises:
modifying the RTI responsive to the petrophysical data indicating that an amount of mud-cake measured by calipering a wellbore of the geological formation at the each depth is indicative of a change in the hydrocarbon productivity.

7. The method of claim 1, further comprising:
measuring the petrophysical data, the petrophysical data measured by at least one of logging-while-drilling (LWD) instruments, wireline instruments, or surface-based instruments.

8. The method of claim 1, wherein the visual representation of the RTI comprises an icon of a plurality of icons, each icon of the plurality of icons indicating at least one of:
a respective potential hydrocarbon productivity of the geological formation;
a respective hydraulic fracturing potential of the geological formation; or
a respective injectivity potential of the geological formation.

9. A non-transitory computer-readable storage medium storing instructions executable by a computer system, the instructions when executed by the computer system cause the computer system to:
receive petrophysical data of a geological formation at a particular rate, the petrophysical data measured at each depth of a plurality of depths from a surface of the Earth;
for each depth of the plurality of depths, determine a rock testability index (RTI) for the geological formation, the RTI indicating a probability of success for performing a hydrocarbon fluid formation test at the each depth, the determining of the RTI comprising:
generating the RTI, the generating comprising normalizing a rock type of the geological formation; and
adjusting the RTI based on a correspondence of the petrophysical data to hydrocarbon productivity;
generate, using a display device of the computer system, a visual representation of the RTI at the particular rate, the visual representation indicating a potential hydrocarbon productivity of the geological formation; and
perform the hydrocarbon fluid formation test at the each depth within the geological formation responsive to the RTI determined at the each depth exceeding a threshold value.

10. The non-transitory computer-readable storage medium of claim 9, wherein the visual representation of the RTI further indicates a hydraulic fracturing potential and an injectivity potential of the geological formation.

11. The non-transitory computer-readable storage medium of claim 9, wherein the adjusting of the RTI comprises:
modifying the RTI responsive to the petrophysical data indicating that the geological formation comprises a particular mineral and that at least one of a density porosity measurement, a sonic travel time measurement, a neutron porosity measurement, a clay content by volume, or a mud-cake measurement exceeds a threshold quantity, the correspondence of the petrophysical data indicating a change in the hydrocarbon productivity.

12. The non-transitory computer-readable storage medium of claim 9, wherein the adjusting of the RTI comprises:
modifying the RTI responsive to the petrophysical data indicating that a percentage by volume of a particular mineral in the geological formation is greater than a threshold percentage by volume of the particular mineral, the correspondence of the petrophysical data indicating a change in the hydrocarbon productivity.

13. The non-transitory computer-readable storage medium of claim 9, wherein the adjusting of the RTI comprises:
increasing the RTI responsive to the petrophysical data indicating that a fluid detected in the geological formation is a hydrocarbon gas mixture, the correspondence of the petrophysical data indicating an increase in the hydrocarbon productivity.

14. The non-transitory computer-readable storage medium of claim 9, wherein the visual representation of the RTI comprises an icon of a plurality of icons, each icon of the plurality of icons indicating at least one of:
a respective potential hydrocarbon productivity of the geological formation;
a respective hydraulic fracturing potential of the geological formation; or
a respective injectivity potential of the geological formation.

15. A computer system comprising:
one or more computer processors; and
a non-transitory computer-readable storage medium storing instructions executable by the one or more computer processors, the instructions when executed by the one or more computer processors cause the one or more computer processors to:
receive petrophysical data of a geological formation at a particular rate, the petrophysical data measured at each depth of a plurality of depths from a surface of the Earth;
for each depth of the plurality of depths, determine a rock testability index (RTI) for the geological formation, the RTI indicating a probability of success for performing a hydrocarbon fluid formation test at the each depth, the determining of the RTI comprising:
generating the RTI, the generating comprising normalizing a rock type of the geological formation; and
adjusting the RTI based on a correspondence of the petrophysical data to hydrocarbon productivity;
generate, using a display device of the computer system, a visual representation of the RTI at the particular rate, the visual representation indicating a potential hydrocarbon productivity of the geological formation; and
perform the hydrocarbon fluid formation test at the each depth within the geological formation responsive to the RTI determined at the each depth exceeding a threshold value.

16. The computer system of claim 15, wherein the visual representation of the RTI further indicates a hydraulic fracturing potential and an injectivity potential of the geological formation.

17. The computer system of claim 15, wherein the adjusting of the RTI comprises:
modifying the RTI responsive to the petrophysical data indicating that the geological formation comprises a particular mineral and that at least one of a density porosity measurement, a sonic travel time measurement, a neutron porosity measurement, a clay content by volume, or a mud-cake measurement exceeds a threshold quantity, the correspondence of the petrophysical data indicating a change in the hydrocarbon productivity.

18. The computer system of claim 15, wherein the adjusting of the RTI comprises:
   modifying the RTI responsive to the petrophysical data indicating that a percentage by volume of a particular mineral in the geological formation is greater than a threshold percentage by volume of the particular mineral, the correspondence of the petrophysical data indicating a change in the hydrocarbon productivity.

19. The computer system of claim 15, wherein the visual representation of the RTI comprises an icon of a plurality of icons, each icon of the plurality of icons indicating at least one of:
   a respective potential hydrocarbon productivity of the geological formation;
   a respective hydraulic fracturing potential of the geological formation; or
   a respective injectivity potential of the geological formation.

20. The non-transitory computer-readable storage medium of claim 9, wherein the adjusting of the RTI comprises:
   modifying the RTI responsive to the petrophysical data indicating that an amount of mud-cake measured by calipering a wellbore of the geological formation at the each depth is indicative of a change in the hydrocarbon productivity.

\* \* \* \* \*